(12) United States Patent
Benjamin

(10) Patent No.: US 9,085,139 B2
(45) Date of Patent: Jul. 21, 2015

(54) METHOD AND ASSEMBLY TO DETECT FLUID

(75) Inventor: Trudy Benjamin, Portland, OR (US)

(73) Assignee: Hewlett-Packard Development Company, L.P., Houston, TX (US)

(*) Notice: Subject to any disclaimer, the term of this patent is extended or adjusted under 35 U.S.C. 154(b) by 0 days.

(21) Appl. No.: 14/005,754

(22) PCT Filed: Jun. 20, 2011

(86) PCT No.: PCT/US2011/041091
§ 371 (c)(1),
(2), (4) Date: Sep. 17, 2013

(87) PCT Pub. No.: WO2012/177235
PCT Pub. Date: Dec. 27, 2012

(65) Prior Publication Data
US 2014/0002538 A1     Jan. 2, 2014

(51) Int. Cl.
| B41J 2/195 | (2006.01) |
| B41J 29/393 | (2006.01) |
| B41J 2/125 | (2006.01) |
| B41J 2/045 | (2006.01) |
| G01F 23/26 | (2006.01) |

(52) U.S. Cl.
CPC .............. B41J 2/125 (2013.01); B41J 2/0451 (2013.01); B41J 2/0458 (2013.01); G01F 23/261 (2013.01)

(58) Field of Classification Search
CPC .............................................. B41J 2002/17579
See application file for complete search history.

(56) References Cited

U.S. PATENT DOCUMENTS

| 6,935,717 B2 | 8/2005 | Su et al. |
| 7,107,837 B2 | 9/2006 | Lauman et al. |
| 7,513,609 B2 | 4/2009 | Katayama |
| 7,547,082 B2 | 6/2009 | Lee et al. |
| 7,874,197 B2 | 1/2011 | Jackson et al. |
| 2005/0219330 A1* | 10/2005 | Sugahara ........................ 347/75 |
| 2007/0153032 A1* | 7/2007 | Chou et al. ........................ 347/7 |
| 2010/0194408 A1 | 8/2010 | Sturmer et al. |
| 2011/0063360 A1* | 3/2011 | Song et al. ...................... 347/19 |
| 2013/0321507 A1* | 12/2013 | Mardilovich et al. ........... 347/14 |
| 2014/0204148 A1* | 7/2014 | Ge et al. .......................... 347/19 |

FOREIGN PATENT DOCUMENTS

| CN | 1488509 A | 4/2014 |
| DE | 4009808 A1 * | 8/1990 |
| JP | 06135001 | 5/1994 |
| JP | 11115201 | 4/1999 |
| JP | 2000318178 | 11/2000 |
| KR | 20030047331 | 6/2003 |
| WO | WO-2011014157 | 2/2011 |
| WO | WO 2011014157 A1 * | 2/2011 |

OTHER PUBLICATIONS

M. van der Veiden; J.W. Spronck; R.H. Munnig Schmidt; J. Wei; P.M. Sarro; Characterization of a Nozzle-integrated Capacitive Sensor for Microfluidic Jet Systems; http://ectm.et.tudelft.nl/publications_pdf/document1180.pdf > Publication Date: 2007; on pp. 1241-1244.

* cited by examiner

*Primary Examiner* — Shelby Fidler
(74) *Attorney, Agent, or Firm* — Hewlett-Packard Patent Department

(57) ABSTRACT

An assembly includes an election chamber, an ejection member, and a capacitance detection unit. The ejection chamber holds a fluid. The ejection member is disposed in the ejection chamber to selectively receive a predetermined amount of power from a power supply line. The capacitance detection unit detects art amount of capacitance.

12 Claims, 4 Drawing Sheets

METHOD AND ASSEMBLY TO DETECT FLUID

BACKGROUND

Inkjet printhead assemblies include an ejection chamber, an ejection member, a chamber opening, and a fluid ejection channel. The ink levels of inkjet printhead assemblies are monitored using various methods. One method of monitoring the level of fluid is by counting the drops of fluid ejected from the printhead. Other methods include positioning an additional sensor either on the printhead near ink access points or external to the printhead, but near the printhead to detect ink from a nozzle.

BRIEF DESCRIPTION OF THE DRAWINGS

Non-limiting examples of the present disclosure are described in the following description, read with reference to the figures attached hereto and do not limit the scope of the claims. In the figures, identical and similar structures, elements or parts thereof that appear in more than one figure are generally labeled with the same or similar references in the figures in which they appear. Dimensions of components and features illustrated in the figures are chosen primarily for convenience and clarity of presentation and are not necessarily to scale. Referring to the attached figures:

DETAILED DESCRIPTION

In the following detailed description, reference is made to the accompanying drawings which form a part hereof, and in which is depicted by way of illustration specific examples in which the present disclosure may be practiced. It is to be understood that other examples may fee utilized and structural or logical changes may be made without departing from the scope of the present disclosure. The following detailed description, therefore, is not to be taken in a limiting sense, and the scope of the present disclosure is defined by the appended claims.

A method and assembly to detect levels of fluid in a printhead are described herein. One method of monitoring the levels of fluid is drop counting. A problem with drop counting is that the method provides approximate levels of fluid. Another method for detecting levels of fluid is by placing a sensor on the printhead. Placing a sensor on the printhead may use an extra nozzle and additional addressing space near fluid access points to clear the nozzle. Accordingly, a method and assembly to accurately monitor levels of fluid in a printhead without additional addressing space near the fluid access points is provided. The method monitors the levels of fluid in the ejection chamber 12 of the printhead 10 by measuring amounts of capacitance, where the amount of capacitance along a power supply line changes depending on the level of fluid covering an ejection chamber.

In examples, an assembly that monitors capacitance to determine the level of fluid is provided. The assembly includes, among other things, an ejection chamber, an ejection member, and a capacitance detection unit. The ejection chamber holds fluid. The ejection member is disposed in the ejection chamber to selectively receive a predetermined amount of power from a power supply line and eject the fluid from the ejection chamber. The capacitance detection unit is connected to at least one of the power supply line and the ejection member to detect an amount of capacitance, where the level of fluid covering the ejection member corresponds to the amount of capacitance.

Figure 1:
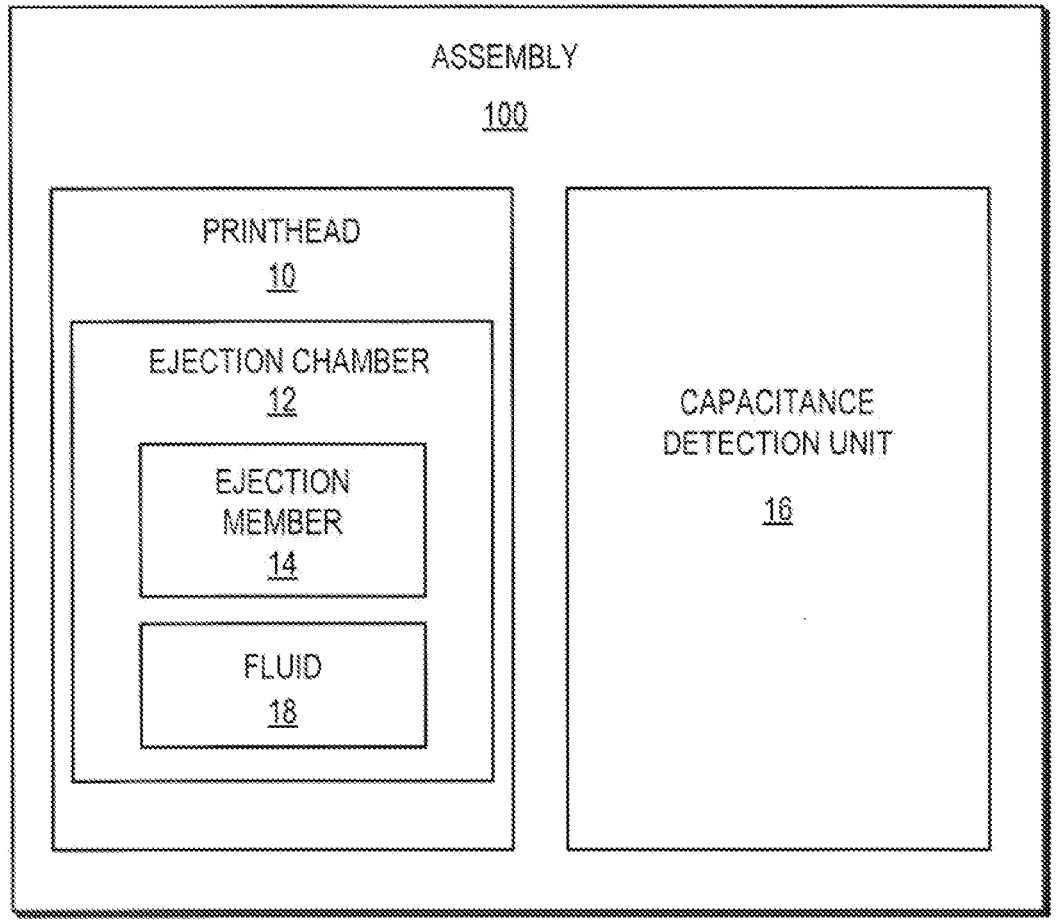
FIG. 1 is a block diagram of an assembly according to an example.

FIG. 1 is a block diagram of an assembly 100 according to an example. The assembly 100 includes a printhead 10 with an election chamber 12 and an ejection member 14 and a capacitance detection unit 16. The ejection chamber 12 holds a fluid 18, such as ink. The ejection chamber 12 receives the fluid 18 from a reservoir (not shown). The ejection member 14 is disposed in the ejection chamber 12 to selectively receive a predetermined amount of power from a power supply line and eject the fluid 18 from the ejection chamber 12. The ejection member 14 may be, for example, a resistor, such as a firing resistor. The capacitance detection unit 16 is electrically connected to at least one of the power supply line and the ejection member 14 to detect an amount of capacitance from the ejection member 14. The amount of capacitance is measured from an electrical signal connected to the election member 14. The amount of capacitance may be measured from an electrical signal directly connected to the ejection member 14 or from a portion of a power supply line that supplies power to at least one election member 14, such that the power supply line does not have an additional load that would prevent measuring the capacitance of the fluid 18 covering the election member 14. For example, the electrical signal may be a clear signal between two different states of fluid in the ejection chamber. Resistance sensing and digital conversion may be performed through an off chip analog-to-digital converter and using firmware configured to be programmed with an algorithm. The electrical signal may, for example, detect wet and dry states.

The electrical signal is utilized to determine the amount of capacitance changes based on the level of fluid 18 covering the ejection member 14. For example, the amount of capacitance measured along the power supply line and/or the ejection member 14 remains constant when the ejection member 14 is covered by a predetermined level of fluid 18, such as when the election chamber 12 is full of fluid 18. However, the amount of capacitance measured along the power supply line and/or the ejection member 14 decreases when the ejection chamber 12 is not full of fluid 18. The decreased capacitance is a result of the level of fluid 18 in the ejection chamber 12, as the capacitance changes when, for example, the ejection chamber 12 is not full and the fluid 18 does not cover the election member 14. In an example, the amount of capacitance measured may decrease by fifteen to forty percent when the amount of the fluid 18 in the printhead 10 is low compared to when the ejection chamber 12 is full of the fluid 18. Specifically, the amount of capacitance measured from an electrical signal connected to the ejection member 14 of a thermal inkjet printhead may decrease by twenty-five to forty percent when the level of fluid 18 in the ejection chamber 12 is not full and does not cover a firing resistor compared to when the ejection chamber 12 is full of fluid 18.

Figure 2:
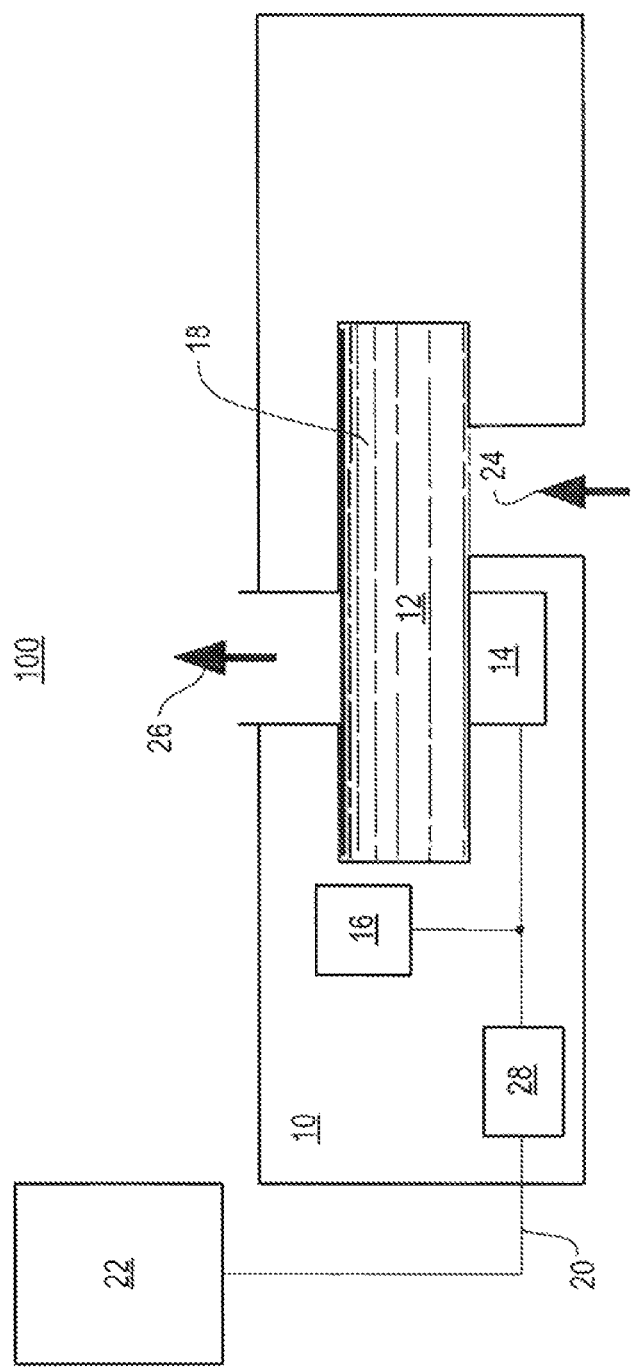
FIG. 2 is a schematic view illustrating an assembly according to an example.
Figure 3:
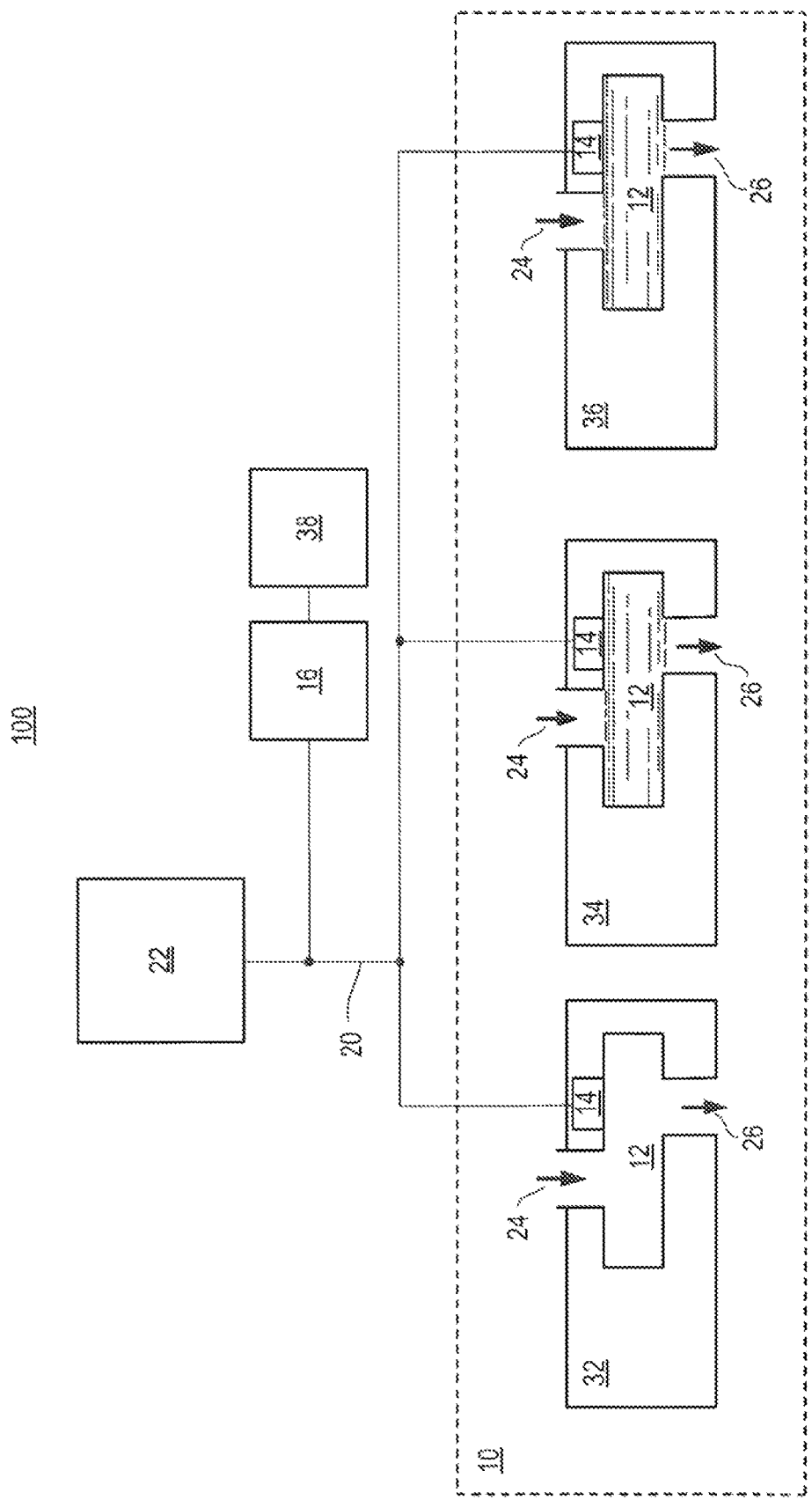
FIG. 3 is a schematic view illustrating an assembly according to an example.

FIG. 2 is a schematic view illustrating an assembly 100, such as a printhead assembly, according to an example. As illustrated in FIG. 2, the assembly 100 includes a printhead 10 with the ejection chamber 12, the ejection member 14, the capacitance detection unit 16, a chamber opening 24, a fluid ejection channel 26, and a transistor set 28. The assembly 100 further includes a power supply line 20 attached to a power supply 22. The chamber opening 24 leads to the ejection chamber 12 and allows fluid to enter the ejection chamber 12. The fluid 18 may remain in the ejection chamber 12 until the ejection member 14 ejects the fluid 18 through the fluid ejection channel 26. The ejection member 14 is shown directly across from the fluid ejection channel 26, but may be location at different positions disposed along the ejection chamber 12. For example, the ejection member 14 may be adjacent to the fluid ejection channel 26. The assembly 100 illustrates only one ejection chamber 12 and ejection member 14; however, as one skilled in the art may appreciate, the assembly 100 may include a plurality of ejection chambers 12 and ejection members 14 on a single printhead 10, as illustrated in FIG. 3 below.

Referring to FIG. 2, the ejection member 14 is connected to the power supply line 20. The power supply Sine 20 selectively supplies a predetermined voltage to the ejection member 14. The power supply line 20 may be, for example, an output line having a three-state logic. The power supply line 20 may supply the power directly to the election member 14 and/or may be connected to the transistor set 28. As illustrated in FIG. 2, the power supply line 20 is connected to the transistor set 28 on the printhead 10. The transistor set 28 may include, for example, five to ten transistors that separate the power supply line 20 into smaller sections, with each transistor feeding several ejection members 14.

For example, the fluid 18 may be ejected using thermal inkjet technology where the ejection member 14 is a firing resistor that heats the fluid 18 in the ejection chamber 12. The heated fluid 18 may form bubbles that push fluid out of the ejection chamber 12 as the bubbles pop. The fluid 18 exits the election chamber 12 through the fluid election channel 26, which directs the fluid 18 out of the printhead 10 onto media.

The level of fluid 18 is detected by the capacitance detection unit 16. The capacitance detection unit 16 receives an electrical signal from at least one of the power supply line 20 and the election member 14. The capacitance detection unit 16 is directly connected to the power supply line 20 or the ejection member 14, such that the line does not have an additional load between the capacitance detection unit 16 and the ejection member 14 that would prevent measuring the capacitance of the fluid 18 covering the ejection member 14. In FIG. 2, the capacitance detection unit 16 on the printhead 10 and is connected to the power supply line 20, which is connected to the ejection member 14. However, the capacitance detection unit 16 may be connected to a power supply line 20 that connects to multiple ejection members 14, as illustrated in FIG. 3 below.

Referring to FIG. 2, the capacitance detection unit 16 includes a transistor set 28, for example 5-10 transistors may be connected to the power supply line 20 between a power supply 22 and the ejection member 14. The capacitance detection unit 16 measures the amount of capacitance along the power supply line 20 between the transistor set 28 and the election member 14 to identify levels of fluid 18. The capacitance defection unit 16 measures the amount of capacitance when the ejection member 14, such as a firing resistor, is in a non-firing state. The amount of capacitance measured varies depending on the level of fluid 18 in the ejection chamber 12, such as the measured amount of capacitance corresponds to whether or not fluid 18 is covering the ejection member 14.

The capacitance detection unit 16 compares the measured amount of capacitance to a predetermined capacitance value to obtain a comparison result. The predetermined capacitance value is a predefined value indicating a specific capacitance value and/or range of capacitance values corresponding to the assembly 100. The predetermined capacitance value may correspond to a level of fluid 18. For example, the measured amount of capacitance may be compared to the predetermined capacitance value, which may be used as a threshold to indicate a level of fluid 18. The comparison result identifies the level of fluid 18 in the ejection chamber 12 to determine whether the ejection chamber 12 is full of fluid 18 or not.

The physical location of the capacitance detection unit 16 may vary depending on the printhead 10. The capacitance detection unit 16 may be positioned internally on the printhead 10 using sensing circuitry attached between the transistor set 28 and the ejection member 14, as illustrated in FIG. 2. For example, the sensing circuitry may be added to a printhead 10 after each high-side switch along the power supply line 20 that connects the high-side switch and the nozzles to monitor levels of fluid 18 for each primitive. The sensing circuitry may be configured to sense resistance related to the capacitance of the fluid 18 covering the ejection member 14 using the electrical signal from at least one of the power supply line 20 and the ejection member 14. For example, the sensing circuitry may translate the capacitance into a gate voltage of a transistor. The translation of the capacitance to the gate voltage changes the resistance of the transistor. The change in the resistance of the transistor may then be measured and related back to a gate voltage to determine an amount of capacitance. Alternatively, the capacitance detection unit 16 may be external to the printhead 10. For example, the capacitance detection unit 16 may be an external computing device, as illustrated below in FIG. 3.

FIG. 3 is a schematic view illustrating, an assembly 100, such as a printhead assembly, according to an example. The assembly 100 includes a power supply 22 with a power supply line 20 that connects to multiple portions of the printhead, such as portions 32, 34, 36. Each portion 32, 34, 36 includes an ejection chamber 12, an ejection member 14, a chamber opening 24, and a fluid ejection channel 26, similar to that described in FIGS. 1-2. The capacitance detection unit 16 is coupled to a power supply line 20 that connects to the printhead 10 and receives power from a power supply 22. Each portion 32, 34, 36 has an ejection member 14 that receives power from the power supply 22 via the power supply line 20. As illustrated in FIG. 3, the same power supply line 20 may be connected to ail three ejection members 14 with each ejection member 14 being located in a separate ejection chamber 12 and each ejection chamber 12 being designated for a single color and/or the same color. For example, the printhead 10 of FIG. 3, may connect a single power supply 22 to three portions 32, 34, 36 of the printhead 10, each portion having an ejection chamber 12 and an ejection member 14 that may each print different ink colors, i.e., cyan, magenta, and yellow.

Referring to FIG. 3, the capacitance detection unit 16 is external to the printhead 10. For example, the capacitance detection unit 16 may be a computing device external to the printhead 10. Although, FIG. 3 illustrates a single printhead 10 with the capacitance detection unit 16 external to the printhead 10, the three portions 32, 34, 38 having separate ejection chambers 12 connected to one power supply line 20, may also be on different printheads 10 (not shown). As discussed in FIGS. 1-2 above, the capacitance defection unit 16 defects the amount of capacitance along the power supply line 20; however, when the power supply line 20 is connected to multiple portions 32, 34, 36 of the printhead 10, such as multiple ejection members 14, as illustrated in FIG. 3, the measured capacitance along the power supply line 20 connected to the three ejection members 14 is combined. For example, if one of the three ejection chambers 12 is not full, such as the ejection chamber 12 of portion 32, the measured amount of capacitance along the power supply line 20 may be reduced proportionally. An example of the reduction would include the amount of capacitance measured reduced by onethird of a decreased capacitance amount for a connection to a single power supply line 20, such as in the example above where the decreased capacitance amount is a reduction to the original amount of capacitance by fifteen to forty percent. Similarly, the amount of capacitance may be measured using the same method when there are multiple printheads connected to a single power supply line 20 (not shown).

In order to compensate for the power supply line 20 being connected to multiple ejection members 14 (i.e., portions 32, 34, 36), the predetermined capacitance value may be adjusted to compensate for multiple ejection members 14. For example, the capacitance detection unit 16 calculates the total capacitance of the total number of ejection members 14, which in this case is three. The total capacitance may be compared to the predetermined capacitance value by the capacitance detection unit 16 to identify the level of fluid 18. A decrease in the total amount of capacitance proportionate to the decrease expected for one printhead having an ejection chamber 12 that is not full would indicate that the level of fluid 18 in one of the printheads is low. Alternatively, the total amount of capacitance measured may be divided by the total number of ejection members 14. The capacitance detection unit 16 may compare the divided total amount of capacitance to the predetermined capacitance value to identify the level of fluid 18 in the election chamber 12.

The assemblies of FIGS. 2-3 may further include a notification unit 38, as illustrated in FIG. 3, for example. The notification unit 38 may be external or internal to the printhead. The notification unit 38 may transmit an audio, visual, and/or electronic notification to indicate levels of fluid 18 to a user or another printing device. The notification unit 38 may indicate that the level of fluid 18 is normal when the level of fluid 18 in the ejection chamber 12 is full and covers the ejection member 14. Conversely, an indication of low fluid may be transmitted when the level of fluid 18 in the election chamber 12 is not full. When the ejection chamber 12 is not full, the notification unit 38 may, for example, transmit an electric signal to a remote print server indicating that a low ink level was detected. The print server may then notify the user of the detected low ink level.

Figure 4:
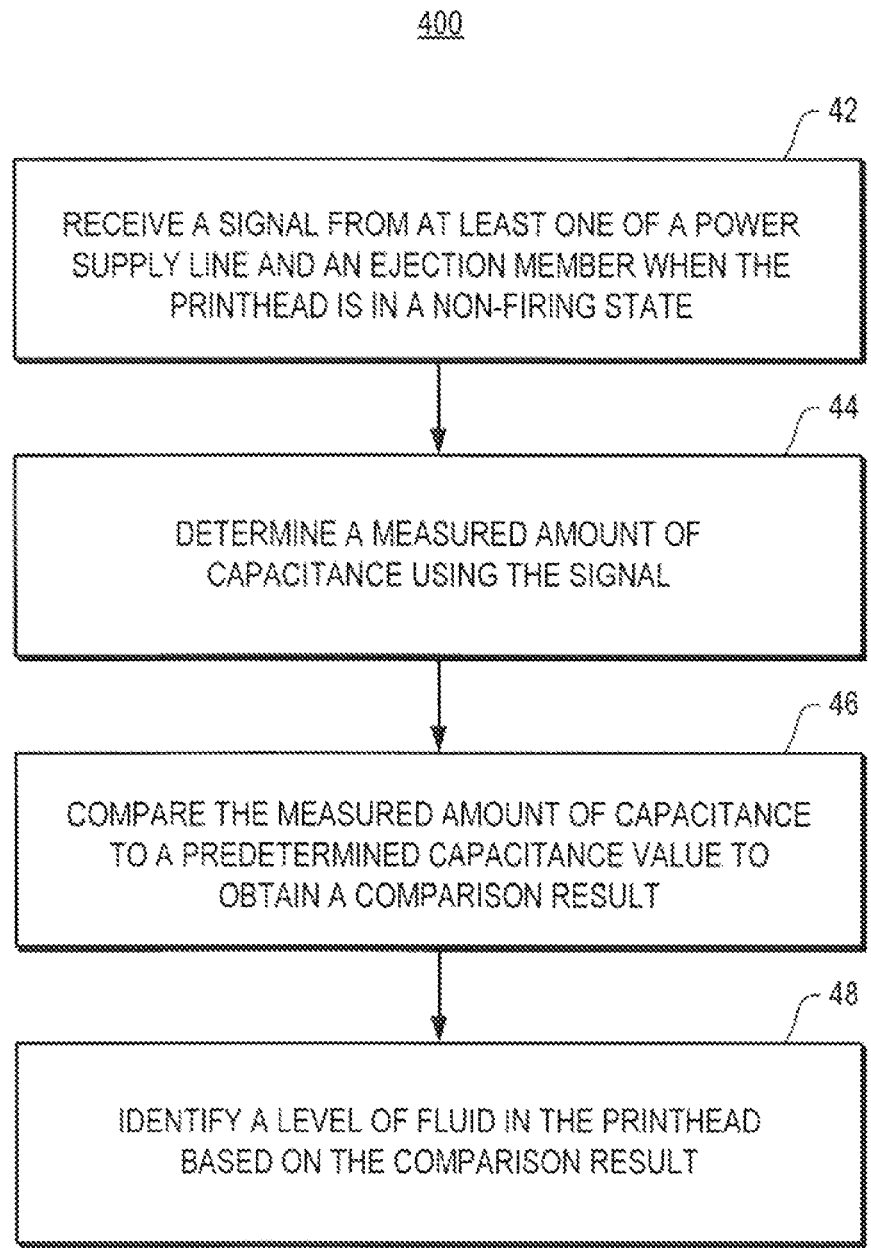
FIG. 4 is a flow chart illustrating a method to identify a level of fluid of an assembly according to an example.

FIG. 4 is a flow chart illustrating a method 400 to identify a level of fluid 18 in a printhead 10. In block 42 an electrical signal from at least one of a power supply line 20 and an ejection member 14, such as a firing resistor, is received. The electrical signal is received when the printhead 10 is in a non-firing state. For example, the electrical signal may be received before a request to begin printing and/or after a request to activate an ejection member 14. The electrical signal is used in block 44 to determine a measured amount of capacitance. The measured amount of capacitance includes the capacitance of the fluid 18 covering the ejection member 14. The amount of capacitance may be measured by a capacitance detection unit 16, such as a computing device external to the printhead 10, as illustrated in FIG. 3 or a circuit on the printhead 10, as illustrated in FIG. 2. In block 46, the measured amount of capacitance is compared to a predetermined capacitance value. The comparison is performed by a capacitance detection unit 16 and a comparison result is obtained from the comparison. The predetermined capacitance value is a predefined value indicating a specific capacitance value or range of capacitance values corresponding to a printhead 10. The predetermined capacitance value may correspond to a level of fluid 18 in the printhead 10, such that the comparison may determine whether the level of fluid 18 in the ejection chamber 12 of the printhead 10 is full or not. The comparison result is used by the capacitance detection unit 16 to identify when the level of fluid 18 in the election chamber 12 of the printhead 10 does not fill the ejection chamber 12, as illustrated in block 48. For example, the comparison result may be compared to a threshold capacitance value to identify an ink level.

The method may further include transmission of an audio, visual, and/or electric notification from a notification unit 38 that indicates that the ejection chamber 12 is filled with fluid 18, such as ink (i.e., normal ink level), or that the ejection chamber 12 is not filled with the fluid 18 (i.e., low ink level). The method may be utilized with various assemblies 100, such that the power supply line 20 is connected to at least one ejection member 14, such as a firing resistor. When the power supply line 20 is connected to multiple ejection members 14, the measured amount of capacitance may be compared to the total amount of capacitance of the total number of ejection members 14 connected to the power supply line 20. The total measured amount of capacitance is then compared to the predetermined capacitance value to identify the level of fluid 18, such as the level of fluid 18 is low and/or the level of fluid is normal.

The present disclosure has been described using non-limiting detailed descriptions of examples thereof and is not intended to limit the scope of the present disclosure. It should be understood that features and/or operations described with respect to one example may be used with other examples and that not all examples of the present disclosure have all of the features and/or operations illustrated in a particular figure or described with respect to one of the examples. Variations of examples described will occur to persons of the art. Furthermore, the terms "comprise," "include," "have" and their conjugates, shall mean, when used in the present disclosure and/or claims, "including but not necessarily limited to."

It is noted that some of the above described examples may include structure, acts or details of structures and acts that may not be essential to the present disclosure and are intended to be exemplary. Structure and acts described herein are replaceable by equivalents, which perform the same function, even if the structure or acts are different, as known in the art. Therefore, the scope of the present disclosure is limited only by the elements and limitations as used in the claims.

What is claimed is:

1. An assembly comprising:
   an ejection chamber to hold a fluid;
   an ejection member disposed in the ejection chamber to selectively receive a predetermined amount of power from a power supply line and eject the fluid from the ejection chamber; and
   a capacitance detection unit connected to the power supply line to detect an amount of capacitance therefrom.

2. The assembly of claim 1, wherein the ejection member is a resistor.

3. The assembly of claim 1, wherein the fluid is an ink.

4. The assembly of claim 1, wherein the capacitance detection unit compares the detected capacitance value to a predetermined capacitance value to identify the level of fluid in the ejection chamber.

5. The assembly of claim 1, wherein the capacitance detection unit is connected to the ejection member via the power supply line.

6. The assembly of claim 1, wherein the amount of capacitance detected by the capacitance detection unit corresponds to the fluid being in contact with the ejection member in the ejection chamber.

7. The assembly of claim 1, wherein the power supply line is coupled to a plurality of ejection members and wherein the capacitance detection unit compares the detected amount of capacitance from all of the ejection member to a predetermined capacitance by dividing the measured amount of capacitance by a total number of the plurality of ejection members connected to the power supply line.

8. An inkjet printhead assembly comprising:
- an ejection chamber to hold a fluid;
- an resistor disposed in the ejection chamber to eject the fluid from the ejection chamber, the resistor having a power supply connected thereto to selectively supply a predetermined amount of power to the resistor; and
- a capacitance detection unit directly coupled to the power supply line to detect an amount of capacitance value from the resistor during a non-firing state, to compare the detected capacitance value to a predetermined capacitance value to obtain a comparison result, and to identify the level of fluid in the ejection chamber based on the comparison result.

9. The inkjet printhead assembly of claim 8, wherein the fluid is an ink.

10. The inkjet printhead assembly of claim 8, wherein the power supply line is an output line having a three-state logic.

11. The inkjet printhead assembly of claim 8, wherein the capacitance detection unit includes a transistor set connected to the power supply line between the power supply and the resistor.

12. The inkjet printhead assembly of claim 8, wherein the power supply line is coupled to a plurality of resistors and wherein the capacitance detection unit compares the detected amount of capacitance of all resistors to a predetermined capacitance by dividing the measured amount of capacitance by a total number of the plurality of resistors connected to the power supply line.

\* \* \* \* \*